UNITED STATES PATENT OFFICE.

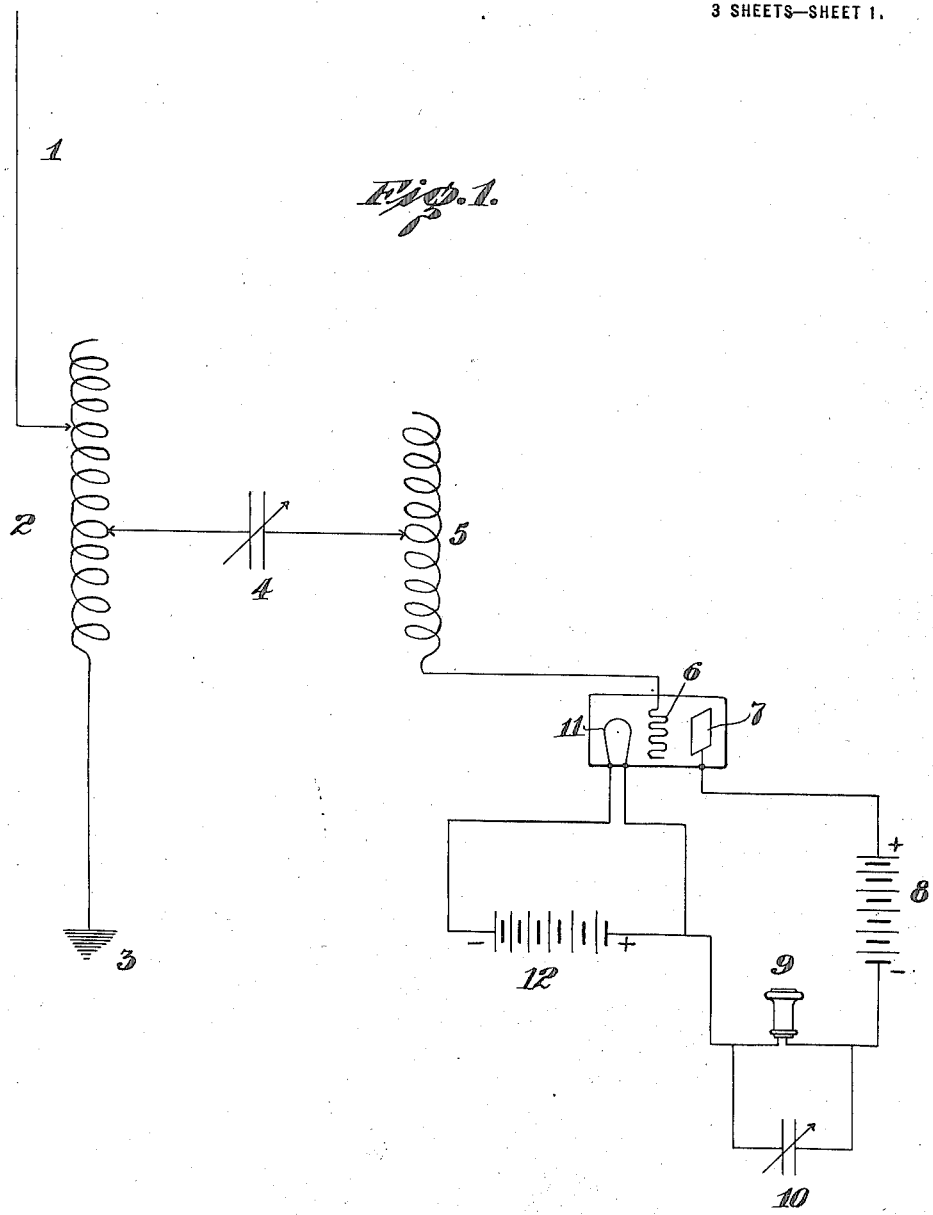

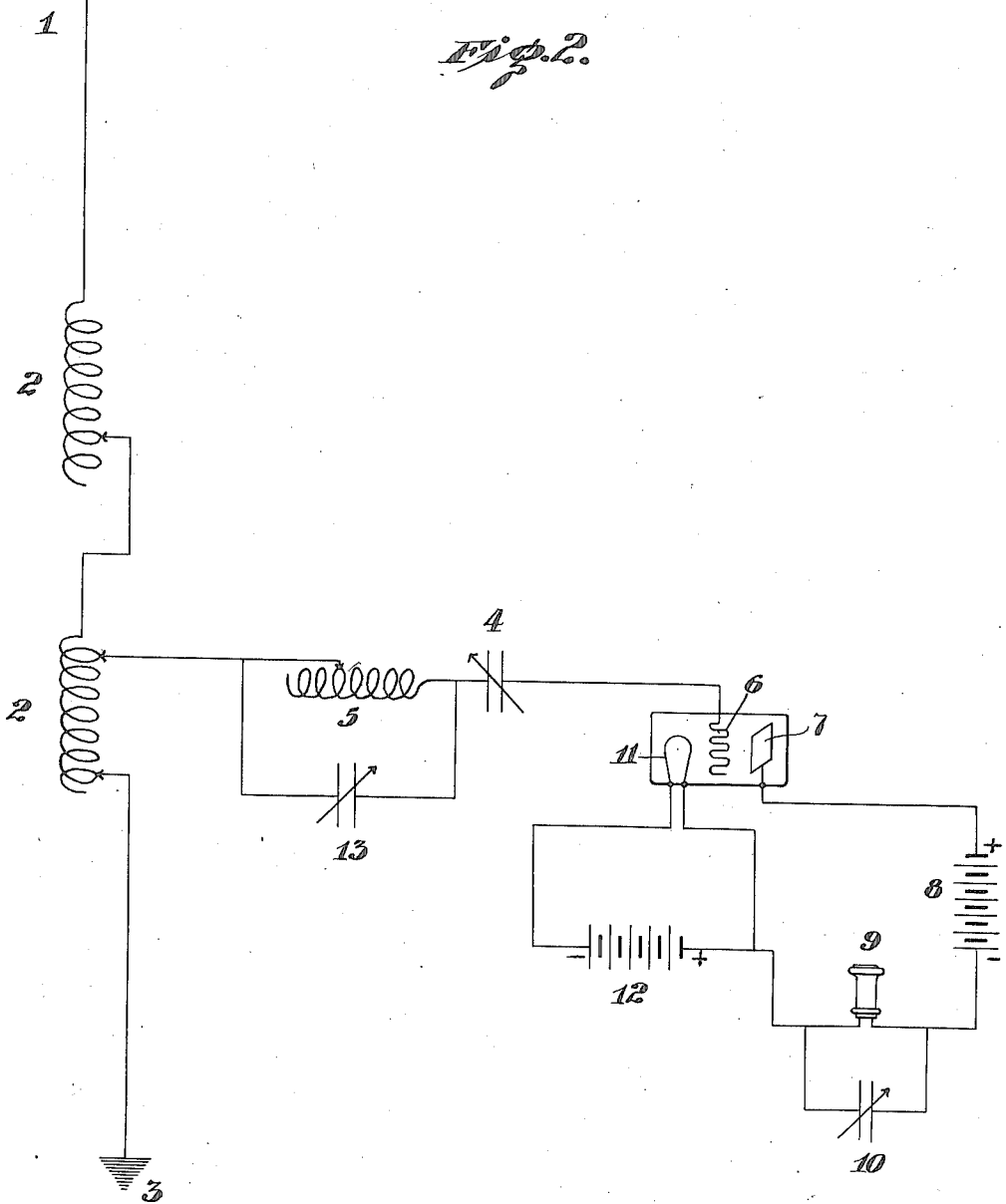

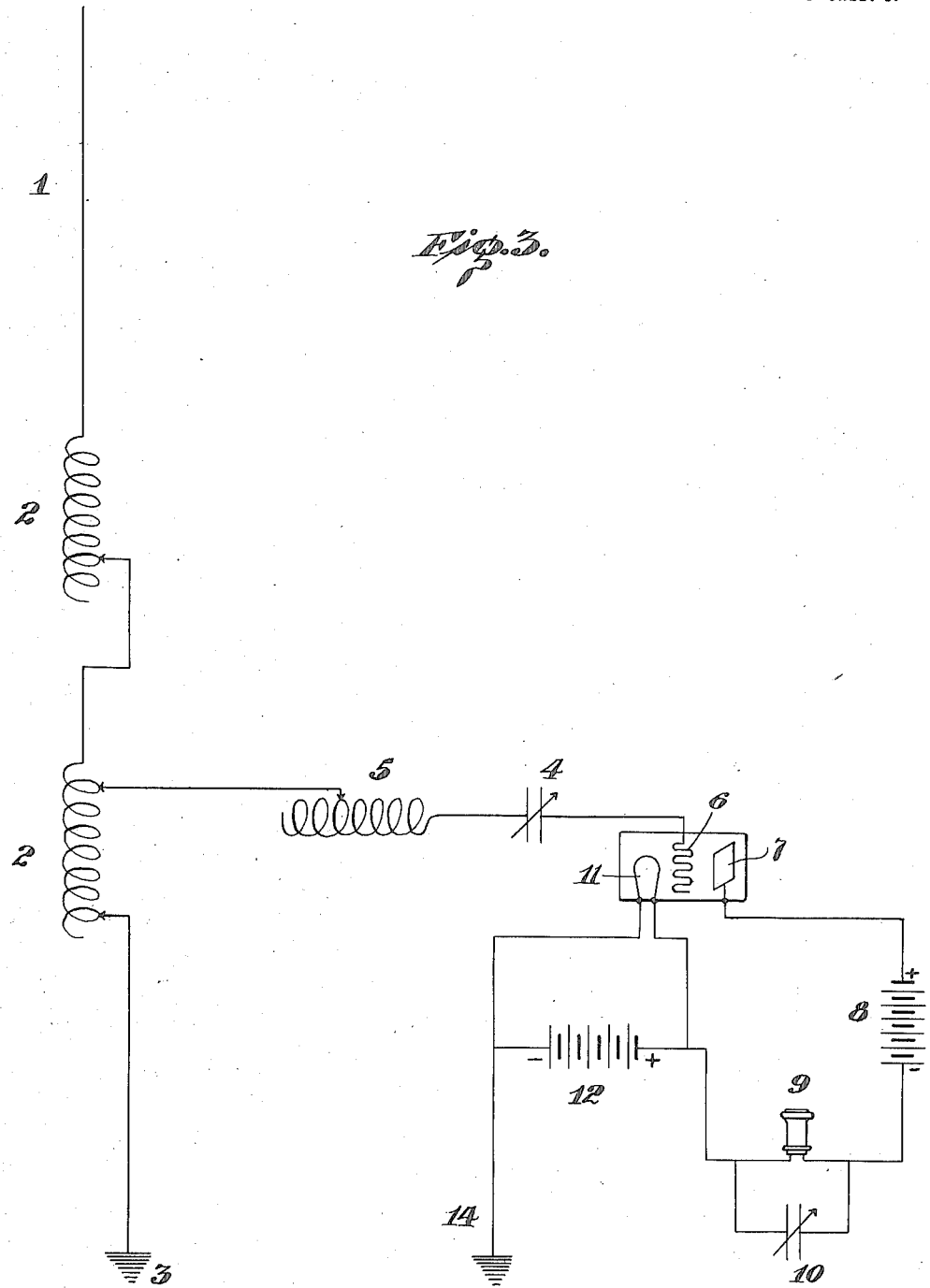

ELMER E. BUTCHER, OF INTERLAKEN, NEW JERSEY, ASSIGNOR TO MARCONI WIRELESS TELEGRAPH COMPANY OF AMERICA, A CORPORATION OF NEW JERSEY.

MEANS FOR DETECTING ELECTRICAL OSCILLATIONS.

1,257,672.      Specification of Letters Patent.    Patented Feb. 26, 1918.

Application filed March 24, 1914. Serial No. 826,858.

*To all whom it may concern:*

Be it known that I, ELMER E. BUTCHER, a citizen of the United States, and a resident of Interlaken, in the county of Monmouth, State of New Jersey, have invented certain new and useful Improvements in Means for Detecting Electrical Oscillations, of which the following is a specification.

The general object of my invention is to increase the sensitiveness of the detecting means for electrical oscillations so as to amplify minute impulses of weak received signals.

I attain this object by providing detecting means in which the highest possible potential obtainable from a given amount of energy derived from the received signals is impressed upon a detector which preferably is a multiple element valve detector, and by so associating the circuits that the secondary circuit shall contain an inductance which is relatively large and is approximately the greatest possible inductance for a given wave length and a relatively small capacity, the coils constituting the inductance having a natural period approximately equal to the period of the received oscillations. The secondary circuit is preferably grounded at one or more points which are substantially the most remote electrically from the terminal of the detector to which the secondary circuit is connected.

By the use of my invention in connection with a single multiple element valve detector, I am able to obtain a greater amplification of weak received signals than by the use of other means, including the well known arrangement of three of such valve detectors in cascade.

I shall describe in this specification and show in the drawings operative forms which my invention may take, but the specification and drawings should not be understood as showing the only forms in which my invention is useful. It is obvious that many modifications of it may be made without departing from the spirit of my invention and that it may be used for various purposes and I, therefore, do not intend to limit myself either to the specific use to which my detecting means are illustrated as being put, nor to the exact form shown. For instance, my device might be modified so that an inductive instead of a direct coupling, or both, might be used, or instead of using the three element valve type of detector illustrated, other forms of multi-element valve detector might be used. Nor do I intend to confine myself to the use of my improved detecting means as a means for detecting any particular kind of electrical oscillations, as they may be used without modification for the detection and amplification of both the damped and undamped oscillations.

In the drawings, as in Figure 1, I have shown my invention in connection with the receiving end of a wireless telegraph system. In Fig. 2 I have shown a modification of Fig. 1 whereby a more exact tuning may be obtained. Fig. 3 shows a further modification.

Although I have shown my invention in connection with wireless telegraphy, this is not the only use to which it may be put, as it may be used wherever it is desired to detect electrical oscillations as, for instance, in wireless, or wire telephony, or wire telegraphy, in manners which will be evident to those skilled in the art.

Referring to Fig. 1, 1 is the aerial which includes a coil 2 which may be used both as an aerial tuning inductance and as the primary of an oscillation transformer. The aerial is earthed, as usual, at 3. The secondary circuit is an open circuit and includes an adjustable inductance 5, which inductance preferably consists of a coil having a very much larger number of turns than inductances heretofore used in the secondary circuits at the receiving end of wireless telegraph systems; so large a number, in fact, that the coils of the secondary circuit, that is, the coil 5 and that portion of the coil 2 which is below the point of attachment of the wire leading to the coil 5, together have a natural period equal approximately to that of the received oscillations. The remainder of the secondary circuit has little effect upon the periodicity of the entire circuit, so that the periodicity of the secondary circuit is practically equal to that of its coils.

By open circuit I mean a circuit which oscillates as an open circuit or linear oscillator, after the manner of an Oudin coil, and which is of such high inductance and low distributed capacity as to cause, at the end terminating in the detector, a great rise of voltage. In this sense such a circuit remains operatively an open circuit even if the filament of the valve detector connected thereto is grounded as in Fig. 3. In other words, it is a circuit in which a great rise of potential occurs but no current flows in a closed path, but rather there is merely the surging of the charging current incident to the rise of the oscillating voltage of the end terminating in the detector.

Coil 5 is connected to the earth by means of a connection which may include a small variable condenser 4, by being connected to a suitable point in coil 2. In addition to the direct connection with the aerial, coil 5 may be inductively coupled therewith to a greater or less degree. Fig. 1 may be taken to illustrate such an arrangement, as well as one in which no such inductive relation exists, as is shown in Figs. 2 and 3. It will be understood that if the points of connection of coil 5 with the aerial circuit be moved down to the point 3, the coupling is entirely inductive, and in such event the inductive coupling is necessary. Where inductive coupling is employed grounding is not essential but the inductive coupling should be made at a point in the open circuit remote from the detector.

Condenser 4 may be inserted in the secondary circuit at various points, or may be dispensed with altogether as it is not essential to the operation of my device, but improves the effects produced. The secondary circuit is connected to one of the elements, preferably the grid element 6, or other cold element of a multiple element valve detector. The three-element detector illustrated is not essential to the operation of my device, since a two-element detector, such as a Fleming oscillation valve, or various other multi-element detectors may be used.

The multiple element valve detector is preferably in the form of a sealed vessel containing a plate element 7, which is connected to a battery 8 and a telephone or other indicating instrument 9, which may be shunted by a condenser 10, the other terminal of the indicating instrument being connected to the circuit including the filament element 11 of the detector.

The filament element 11 is connected with a battery 12, the battery strength being so controlled as to properly heat the filament.

In the operation of my device I first adjust the inductance of the aerial circuit 1, 2, 3 so that this circuit is in resonance with the incoming signals. The batteries 8 and 12 and condenser 10 are then adjusted so that the detector is in a condition of maximum sensitiveness. I then adjust the capacity of the variable condenser 4 and the length of the coil 5, until a satisfactory response is obtained in the telephone 9.

In Fig. 2 I have shown a modification of my apparatus, which consists in placing a small condenser 13 in shunt with the coil 5. I find that by varying the capacity of condenser 13 the tuning of the receiving circuit becomes more sharply marked, aiding in the elimination of undesired signals.

However, I do not recommend the use of this condenser under all conditions, since capacity in the secondary circuit is in general to be avoided, but under certain conditions as, for instance, in the reception of very long wave lengths, a small capacity has a certain utility.

In Fig. 3 I have shown a further modification which consists in grounding one side of the filament element of the detector on a wire 14. This arrangement is useful in certain cases as, for instance, in the presence of undesirable electrical disturbances.

What I claim is:

1. Means for detecting electrical oscillations, comprising a circuit tuned to the period of the oscillations to be received, and a second open circuit associated therewith, containing a multiple element valve detector, an inductance, the natural period of said inductance approximating that of the received oscillations.

2. Means for detecting electrical oscillations, comprising a circuit tuned to the period of the oscillations to be received, a second open circuit associated therewith, containing an inductance, the natural period of said inductance approximating that of the received oscillations, and a multiple element valve detector, one element of which is connected to the second circuit.

3. Means for detecting electrical oscillations, comprising a circuit tuned to the period of the oscillations to be received, an open circuit associated therewith and connected to an element of a multiple element valve detector and grounded at a point electrically most remote from the connected detector element.

4. Means for detecting electrical oscillations, comprising a circuit tuned to the period of the oscillations to be received, a second circuit associated therewith, containing an inductance, the natural period of said inductance together approximating that of the received oscillations, and being connected to one element of a multiple element valve detector, and grounded at a point electrically most remote from the connected detector element.

5. Means for detecting electrical oscillations, comprising an open secondary circuit containing a multiple element valve type detector, said circuit associated with an aerial.

6. Means for detecting electrical oscillations, comprising an aerial and an open secondary circuit associated therewith and terminating in one element of a multiple element valve detector.

7. Means for detecting electrical oscillations, comprising an aerial, an open secondary circuit associated therewith, terminating in an element of a multiple element valve detector, interposed between two other elements of said detector.

8. Means for detecting electrical oscillations, comprising an aerial and an open secondary circuit associated therewith, containing an inductance and a multiple element valve detector.

9. Means for detecting electrical oscillations, comprising an aerial, an open secondary circuit associated therewith containing an inductance and terminating in one element of a multiple element valve detector.

10. Means for detecting electrical oscillations, comprising an aerial and an open secondary circuit containing an inductance and a multiple element valve detector associated therewith, the natural period of said inductance being approximately equal to that of the received oscillations.

11. Means for detecting electrical oscillations, comprising an aerial, an open secondary circuit associated therewith and containing an inductance, the natural period of said inductance being approximately that of the received oscillations and terminating in an element of a multiple element valve detector, interposed between two other elements of said detector.

12. Means for detecting electrical oscillations comprising a grounded open secondary circuit containing a multiple element valve detector, said circuit associated with an aerial.

13. Means for detecting electrical oscillations, comprising an aerial, and a grounded open secondary circuit associated therewith and terminating in one element of a multiple element valve detector.

14. Means for detecting electrical oscillations, comprising an aerial, a grounded open secondary circuit associated therewith, terminating in an element of a multiple element valve detector, interposed between two other elements of said detector.

15. Means for detecting electrical oscillations, comprising an aerial and a grounded open secondary circuit associated therewith, containing an inductance and a multiple element valve detector.

16. Means for detecting electrical oscillations, comprising an aerial, a grounded open secondary circuit associated therewith, containing an inductance and terminating in one element of a multiple element valve detector.

17. Means for detecting electrical oscillations, comprising an aerial, and a grounded open secondary circuit containing an inductance and a multiple element valve detector associated therewith, said inductance having a natural period approximately equal to that of the received oscillations.

18. Means for detecting electrical oscillations, comprising an aerial, an open secondary circuit associated therewith and connected at one end to the ground and at the other end to an element of a multiple element valve detector.

19. Means for detecting electrical oscillations, comprising an aerial, an open secondary circuit associated therewith, containing an inductance and grounded at one end and connected at the other end to an element of a multiple element valve detector.

20. Means for detecting electrical oscillations, comprising an aerial, an open secondary circuit associated therewith and containing an inductance, the natural period of said inductance being approximately that of the received oscillations and connected at one end to the ground and at the other end to an element of a multiple element valve detector.

21. Means for detecting electrical oscillations, comprising an aerial, an open secondary circuit associated therewith, containing an inductance and connected at one end to an element of a multiple element valve detector, and to the ground at a point electrically most remote from the said connected detector element.

22. Means for detecting electrical oscillations, comprising an aerial, an open secondary circuit associated therewith, containing an inductance, the natural period of said inductance being approximately that of the received oscillations, and connected at one end to an element of a multiple element valve detector, interposed between two other elements of said detector and at the other end to the ground.

23. Means for detecting electrical oscillations, comprising a secondary circuit containing a multiple element valve detector, said circuit having the form of an open oscillating circuit and having a natural period approximating that of the received oscillations.

24. Means for detecting electrical oscillations, comprising a secondary circuit in the form of an open oscillating circuit, having a natural period approximately that of the received oscillations connected to an element of a multiple element valve detector and grounded at a point electrically most remote from the said connected detector element.

25. Means for detecting electrical oscillations, comprising an aerial, a secondary circuit having a natural period approximately that of the received oscillations connected at one end to an element of a multiple element valve detector and at the other end to the earth through a direct coupling to the aerial circuit.

26. Means for detecting electrical oscillations comprising a secondary circuit having a natural period approximately that of the received oscillations, a multiple element valve detector to one element of which the secondary circuit is connected, the secondary circuit being connected to the ground at a point electrically most remote from the connected detector element.

27. Means for receiving electrical impulses comprising in combination a primary circuit, and an open secondary circuit associated with said primary circuit, said secondary circuit including a high inductance as compared to the secondary capacity and a detector.

28. Means for receiving electrical impulses comprising in combination a primary circuit, and a grounded open secondary circuit associated therewith, said secondary circuit containing a high inductance compared to the secondary capacity and a detector.

29. Means for detecting electrical impulses comprising a primary circuit, and a secondary circuit associated therewith including a very high inductance compared to the capacity thereof and a detector.

30. Means for detecting electrical impulses comprising a primary circuit, a secondary circuit associated therewith including a very high inductance compared to its capacity, a vacuum valve detector connected to said secondary circuit, and an indicating circuit associated with said valve detector including no more than a small inductance compared with the inductance of said secondary circuit and having no inductance in common with said secondary circuit.

In testimony whereof I have hereunto signed my name in the presence of two witnesses this 23d day of March, 1914.

ELMER E. BUTCHER.

Witnesses:
Wm. M. Earl,
Walter S. Jones.